United States Patent
Robinson (10) Patent No.: US 8,839,998 B1
(45) Date of Patent: Sep. 23, 2014

(54) CHAINSAW RACK FOR PICKUP TRUCKS, OFF ROAD UTILITY VEHICLES AND THE LIKE

(76) Inventor: Nathan A. R. Robinson, North San Juan, CA (US)

(*) Notice: Subject to any disclaimer, the term of this patent is extended or adjusted under 35 U.S.C. 154(b) by 153 days.

(21) Appl. No.: 13/418,569

(22) Filed: Mar. 13, 2012

(51) Int. Cl.
   *B60R 9/00* (2006.01)

(52) U.S. Cl.
   USPC ............ 224/403; 224/456; 224/459; 224/461

(58) Field of Classification Search
   CPC .............. B60R 9/00; B60R 9/10; B60R 9/08; B60P 3/1033; B60P 3/40; B62J 7/04; B62J 7/00; B62J 9/00
   USPC ............................................................ 296/3
   See application file for complete search history.

(56) References Cited

U.S. PATENT DOCUMENTS

| | | | |
|---|---|---|---|
| D248,422 S | 7/1978 | Malcolm | |
| D282,801 S | 3/1986 | Goins et al. | |
| 4,727,777 A * | 3/1988 | Obester | 76/79.5 |
| 4,846,385 A | 7/1989 | Fratus | |
| 5,007,568 A * | 4/1991 | Da Vault | 224/552 |
| 5,119,937 A | 6/1992 | Reynolds, Jr. | |
| 5,516,020 A | 5/1996 | Lawler et al. | |
| 5,641,106 A | 6/1997 | Slaughter et al. | |
| 5,692,791 A * | 12/1997 | Sulzer | 296/3 |
| 5,741,038 A * | 4/1998 | Fowler et al. | 296/3 |
| 6,457,619 B1 | 10/2002 | Werner et al. | |
| 7,464,976 B2 | 12/2008 | Smith | |
| 7,624,862 B1 | 12/2009 | Pleggenkuhle | |
| 7,762,510 B2 * | 7/2010 | Eller | 248/309.1 |
| 2007/0102468 A1* | 5/2007 | Storer | 224/403 |
| 2009/0302077 A1 | 12/2009 | Yee et al. | |

* cited by examiner

*Primary Examiner* — Adam Waggenspack
(74) *Attorney, Agent, or Firm* — Richard L Miller (57) ABSTRACT

A rack replaceably attached only to a pair of side walls of a cargo bay of either a pickup truck or an off-road utility vehicle, and carries at least one chainsaw without having to conceal the at least one chainsaw. A base is replaceably attached only to the pair of side walls of the cargo bay of either the pickup truck or the off-road utility vehicle. A pair of end carriers are disposed at ends of the base, respectively, and replaceably carry a non-working end of each of the at least one chainsaw, respectively, without having to conceal the at least one chainsaw. A central carrier is disposed midway between the ends of the base, and replaceably carries a working end of each of the at least one chainsaw without having to conceal the at least one chainsaw.

27 Claims, 7 Drawing Sheets

CHAINSAW RACK FOR PICKUP TRUCKS, OFF ROAD UTILITY VEHICLES AND THE LIKE

1. BACKGROUND OF THE INVENTION

A. Field of the Invention

The embodiments of the present invention relate to a chainsaw carrier, and more particularly, the embodiments of the present invention relate to a rack for being replaceably attached only to a pair of tops of a pair of side walls, respectively, of a cargo bay of either a pickup truck, an off-road utility vehicle, or the like, and for carrying at least one chainsaw without having to conceal any part of the at least one chainsaw.

B. Description of the Prior Art

Numerous innovations for chainsaw, bicycle, archery bow, and surfboard storage-related devices have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a rack for being replaceably attached only to a pair of tops of a pair of side walls, respectively, of a cargo bay of either a pickup truck, an off-road utility vehicle, or the like, and for carrying at least one chainsaw without having to conceal any part of the at least one chainsaw.

(1) U.S. Pat. No. Des 248,422 to Malcolm

U.S. Pat. No. Des 248,422—issued to Malcolm on Jul. 4, 1978 in U.S. class D3 and subclass 269—teaches the ornamental design for a combined carrying and storage case for a chainsaw.

(2) U.S. Pat. No. Des 282,801 to Goins et al

U.S. Pat. No. Des 282,801—issued to Goins et al. on Mar. 4, 1986 in U.S. class D6 and subclass 553—teaches the ornamental design for a storage bracket for a chainsaw.

(3) U.S. Pat. No. 4,846,385 to Fratus

U.S. Pat. No. 4,846,385—issued to Fratus on Jul. 11, 1989 in U.S. class 224 and subclass 569—teaches a lockable bracket for chainsaws especially suited for mounting outside to the tailgate of a pickup truck. A substantially rectangular panel having two narrow sides curvedly right angled forms a flattened U-shape housing. Longitudinally, the opened side of the U, and the edges thereof, are sharply right angled outwardly into narrow mounting flanges attached to a rectangular base. The rectangular base has the same width and length as the two attached flanges and the top panel. The base acts as a second wall allowing protective insertion of a chainsaw blade inside the flattened U structure between the panel and the base. The edges of the base where the flanges are attached serve as the mounting surface, and has attachment apertures for mounting by bolts of screws. The bracket is for mounting on the outside of a pickup truck tailgate, but can be mounted on any support surface including a wall for display purposes.

(4) U.S. Pat. No. 5,119,937 to Reynolds, Jr

U.S. Pat. No. 5,119,937—issued to Reynolds, Jr. on Jun. 9, 1992 in U.S. class 206 and subclass 349—teaches a case having a tray-like open-top base member that closely receives the lower portion of a chainsaw upon downward movement of the saw into case base member, and automatically and releasably connects to the chainsaw by resilient detent elements. Upward movement of the chainsaw relative to the case base member automatic effects release of the detent elements. Tools and other articles used for operation or maintenance of the chainsaw are stored within open-top storage compartments in the bottom of the case base member. The articles are retained within the compartments by the overlying main body of the chainsaw when the chainsaw and case base member are interconnected and some of the articles are also retained in their compartments by additional detent elements. A scabbard is releasably retained upon the cutting chain assembly of the chainsaw by ribs that engage the opposite sides of the assembly, and by a flange upon the inner end of the scabbard. Removal of the scabbard from the cutting chain assembly can be effected by preliminary upward movement of the inner end of the scabbard followed by longitudinal movement thereof away from the case base member, while the case base member and the chainsaw are interconnected. The case and its detent elements are, preferably, made of blow-molded plastic material.

(5) U.S. Pat. No. 5,516,020 to Lawler et al

U.S. Pat. No. 5,516,020—issued to Lawler et al. on May 14, 1996 in U.S. class 224 and subclass 405—teaches a bicycle storage rack that can be mounted or demounted from the cargo area of pick-up trucks. The rack includes a lower tubular base and an upper tubular member joined by a plurality of upright posts, spaced by slots for bicycle wheels. The lower tubular base fits comfortably in the foremost corner of the cargo area of the pick-up truck. The upper tubular member is secured to the sides of the pick-up truck with straps, cords, or wires. A bicycle is held securely in the rack by a C-shaped hook or clamp that fits around the steering neck of the bicycle frame, and is secured with a specially designed locknut. No additional straps, nuts, locks, or other devices are needed to securely hold the bicycle in the rack. The bicycle storage rack is also constructed to be mounted on a surface platform when not in use in the back of a pick-up truck.

(6) U.S. Pat. No. 5,641,106 to Slaughter et al

U.S. Pat. No. 5,641,106—issued to Slaughter et al. on Jun. 24, 1997 in U.S. class 224 and subclass 324—teaches a removable archery bow storage rack for vehicles, which includes a first frame half and a second frame half. A pair of tensioning adjustment straps secure the first frame half to the second frame half. Opposed hood anchor assemblies, in combination with the tensioning adjustment straps, secure the first and second frame halves to the hood of a vehicle without any modification or alteration of the vehicle. A plurality of leg rest assemblies are disposed between each of the frame halves and the top surface of the hood. The leg rest assemblies include a damping device to dampen vibrations and absorb shock imparted to the first and second frame halves during transit. Pairs of limb rest assemblies and string support assemblies on each frame half allow an archery bow to be secured to each of the frame halves in part by the draw weight of the particular bow.

(7) U.S. Pat. No. 6,457,619 to Werner et al

U.S. Pat. No. 6,457,619—issued to Werner et al. on Oct. 1, 2002 in U.S. class 224 and subclass 405—teaches a truckbed-mounted surfboard storage rack that aids in the storage and transportation of surfboards via pickup trucks and vans. Two fold-up arms have three slots in each one, with each slot being padded with a weatherproof foam material. When extended in the up position, the slots allow up to three surfboards to be stored in a horizontal position on their long edge. When in the lowered position, the carrier folds flat against the floor of the truck or van to provide the maximum storage space for other items. When secured to the frame of the pickup truck or van with mechanical hardware, such as stainless steel nuts and bolts, the carrier can also be used for snow boards or other similarly shaped objects.

(8) U.S. Pat. No. 7,464,976 to Smith

U.S. Pat. No. 7,464,976—issued to Smith on Dec. 16, 2008 in U.S. class 296 and subclass 3—teaches a vehicle bed storage device including a rotatable beam. The beam includes a pair of aligned tubular members. The beam is rotatable between a first position in which the storage device defines a vehicle bed divider and a second position in which the storage device defines an overhead storage rack. Rotatable joints connect the beam to the vehicle bed and allow the beam to be rotated between stops at the first position and the second position. At least one clamp maintains the aligned orientation of the tubular members of the beam. A sleeve-based mounting interface is applied to the tubular members of the beam to facilitate mounting various objects to the beam. Alternatively, a clamp-based mounting interface is applied to the beam to facilitate mounting various objects to the beam.

(9) U.S. Pat. No. 7,624,862 to Pleggenkuhle

U.S. Pat. No. 7,624,862—issued to Pleggenkuhle on Dec. 1, 2009 in U.S. class 206 and subclass 349—teaches a chainsaw blade carrier including a first piece and a second piece having U-shaped outer grooves that form an outer perimeter for a chainsaw blade. A connecting member joins the first piece and the second piece, and is moveable between an extended position and a retracted position. The first piece, the second piece, and the connecting member together form a structure that approximates the length and width of a chainsaw guide upon a chainsaw. The first and second pieces are removable between a retracted position and an extended position to place and remove a chainsaw blade upon the outer perimeter. The method of using a chainsaw blade carrier includes the steps compressing the chainsaw blade carrier connecting member to the retracted position, positioning a chainsaw blade upon the outer perimeter, and permitting the chainsaw blade carrier to return to the extended position.

(10) United States Patent Application Publication Number 2009/0302077 to Yee et al United States Patent Application Publication Number 2009/0302077—published to Yee et al. on Dec. 10, 2009 in U.S. class 224 and subclass 405—teaches a bicycle rack made from tubular components, which can be secured in the cargo bed of a pick-up truck without the use of any tools. In use, at least four bicycles, with both front and back wheels attached, are held in an upright position, with both wheels down upon the truck bed.

It is apparent that numerous innovations for chainsaw, bicycle, archery bow, and surfboard storage-related devices have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a rack for being replaceably attached only to a pair of tops of a pair of side walls, respectively, of a cargo bay of either a pickup truck, an off-road utility vehicle, or the like, and for carrying at least one chainsaw without having to conceal any part of the at least one chainsaw.

2. SUMMARY OF THE INVENTION

Thus, an object of the embodiments of the present invention is to provide a rack for being replaceably attached only to a pair of tops of a pair of side walls, respectively, of a cargo bay of either a pickup truck, an off-road utility vehicle, or the like, and for carrying at least one chainsaw without having to conceal any part of the at least one chainsaw, which avoids the disadvantages of the prior art.

Briefly stated, another object of the embodiments of the present invention is to provide a rack replaceably attached only to a pair of tops of a pair of side walls, respectively, of a cargo bay of either a pickup truck, an off-road utility vehicle, or the like, and carrying at least one chainsaw without having to conceal any part of the at least one chainsaw. Each chainsaw of the at least one chainsaw has a guide bar and chain working end and a housing non-working end. The rack includes a base, a pair of end carriers, and a central carrier. The base has a pair of opposing ends, and is replaceably attached only to the pair of tops of the pair of side walls, respectively, of the cargo bay of either the pickup truck, the off-road utility vehicle, or the like. The pair of end carriers are disposed at the pair of opposing ends of the base, respectively, and replaceably carry the housing non-working end of an associated chainsaw of the at least one chainsaw, respectively, without having to conceal any part of the associated chainsaw of the at least one chainsaw. The central carrier is disposed midway between the pair of opposing ends of the base, and replaceably carries the guide bar and chain working end of each chainsaw of the at least one chainsaw without having to conceal any part of each chainsaw of the at least one chainsaw.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 3 is a diagrammatic perspective view of the rack of the embodiments of the present invention shown in FIG. 2 in the midst of being attached only to the pair of tops of the pair of side walls, respectively, of the cargo bay of either the pickup truck, the off-road utility vehicle, or the like;

4. LIST OF REFERENCE NUMERALS UTILIZED IN THE FIGURES OF THE DRAWING

A. Introduction.
20 rack of embodiments of present invention for being replaceably attached only to pair of tops 22 of pair of side walls 24, respectively, of cargo bay 26 of either pickup truck 28, off-road utility vehicle, or like, and for carrying at least one chainsaw 30 without having to conceal any part of each chainsaw of at least one chainsaw 30
22 pair of tops of pair of side walls 24, respectively, of cargo bay 26 of either pickup truck 28, off-road utility vehicle, or like
24 pair of side walls, respectively, of cargo bay 26 of either pickup truck 28, off-road utility vehicle, or like
26 cargo bay of either pickup truck 28, off-road utility vehicle, or like
28 pickup truck
30 at least one chainsaw
31 guide bar and chain working end of each chainsaw of at least one chainsaw 30
31a housing non-working end of each chainsaw of at least one chainsaw 30
B. Overall Configuration of Rack 20.
32 base for being replaceably attached only to pair of tops 22 of pair of side walls 24, respectively, of cargo bay 26 of either pickup truck 28, off-road utility vehicle, or like
34 pair of end carriers for replaceably carrying housing non-working end 31a of each chainsaw of at least one chainsaw 30, respectively, without having to conceal any part of each chainsaw of at least one chainsaw 30
36 central carrier for replaceably carrying guide bar and chain working end 31 of each chainsaw of at least one chainsaw 30, respectively, without having to conceal any part of each chainsaw of at least one chainsaw 30
38 pair of opposing ends of base 32
(1) Specific Configuration of Base 32.
40 pair of rails of base 32
42 ends of pair of rails 40 of base 32
44 dedicated mounting plate of associated ends of ends 42 of pair of rails 40 of base 32 for replaceably attaching base 32 only to pair of tops 22 of pair of side walls 24, respectively, of cargo bay 26 of either pickup truck 28, off-road utility vehicle, or like
44a rubber lower surface of dedicated mounting plate 44 of associated ends of ends 42 of pair of rails 40 of base 32 for preventing damage to pair of tops 22 of pair of side walls 24, respectively, of cargo bay 26 of either pickup truck 28, off-road utility vehicle, or like once rack 20 is mounted
45 mounting bolts
45a through bores in dedicated mounting plate 44 of associated ends of ends 42 of pair of rails 40 of base 32
(2) Specific Configuration of Pair of End Carriers 34.
48 pair of locking rod mounts of each end carrier of pair of end carriers 34
50 post of each locking rod mount of pair of locking rod mounts 48 of each end carrier of pair of end carriers 34
52 triangular-shaped plate of each locking rod mount of pair of locking rod mounts 48 of each end carrier of pair of end carriers 34
54 plurality of differently sized through bores of the triangular-shaped plate of each locking rod mount of pair of locking rod mounts 48 of each end carrier of pair of end carriers 34
56 rubber-faced deck plate of each end carrier of pair of end carriers 34 for having housing non-working end 31a of each chainsaw of at least one chainsaw 30 rest thereon during use of rack 20
58 locking slide rod of each end carrier of pair of end carriers 34
60 head of locking slide rod 58 of each end carrier of pair of end carriers 34
62 shank of locking slide rod 58 of each end carrier of pair of end carriers 34
64 end of shank 62 of locking slide rod 58 of each end carrier of pair of end carriers 34
66 through bore of shank 62 of locking slide rod 58 of each end carrier of pair of end carriers 34
68 handle of associated chainsaw of at least one chainsaw 30
70 lock of each end carrier of pair of end carriers 34
(3) Specific Configuration of Central Carrier 36.
72 base of central carrier 36
74 rod of base 72 of central carrier 36
75 ends of rod 74 of base 72 of central carrier 36
76 pair of posts of base 72 of central carrier 36
78 pair of bar guide mounts of central carrier 36
80 block of each bar guide mount of pair of bar guide mounts 78 of central carrier 36
82 backing plate of each bar guide mount of pair of bar guide mounts 78 of central carrier 36
84 through slot of backing plate 82 of each bar guide mount of pair of bar guide mounts 78 of central carrier 36
86 plurality of tabs of backing plate 82 of each bar guide mount of pair of guide bar mounts 78 of central carrier 36
88 cradle of each bar guide mount of pair of guide bar mounts 78 of central carrier 36
90 chainsaw bar guide of each guide mount of pair of guide bar mounts 78 of central carrier 36
92 through slot of chainsaw bar guide 90 of each guide mount of pair of guide bar mounts 78 of central carrier 36
94 compound through slot of each guide mount of pair of guide bar mounts 78 of central carrier 36 for receiving guide bar and chain working end 31 of associated chainsaw of the at least one chainsaw

5. DETAILED DESCRIPTION OF THE PREFERRED EMBODIMENTS

A. Introduction.

Figure 1:
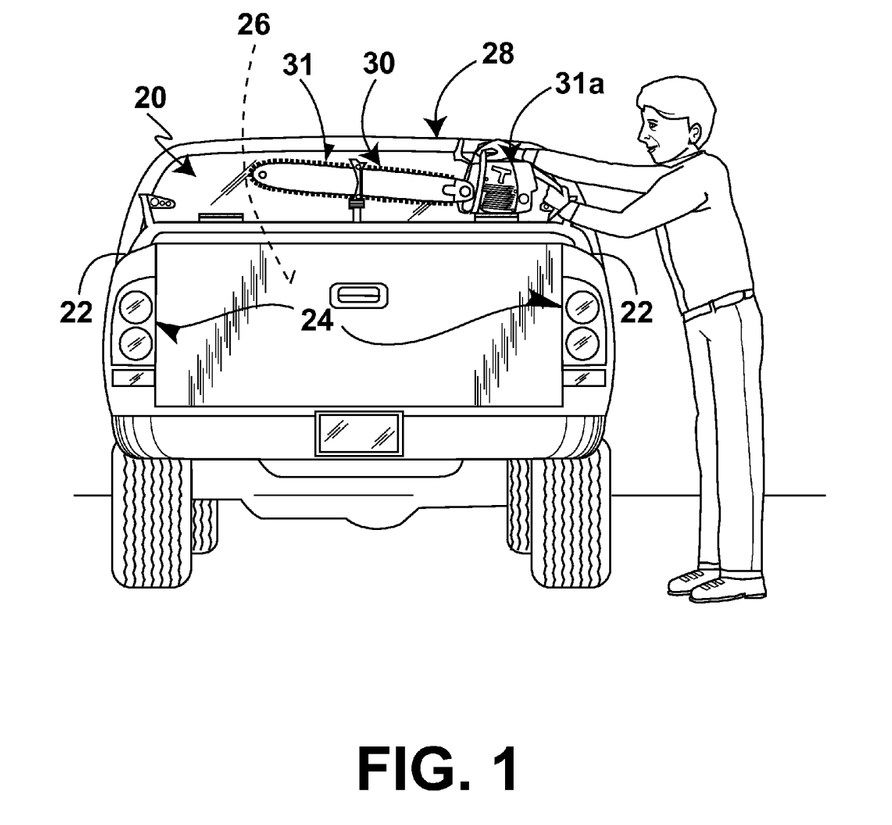
FIG. 1 is a diagrammatic rear end view of the rack of the embodiments of the present invention replaceably attached only to a pair of tops of a pair of side walls, respectively, of a cargo bay of either a pickup truck, an off-road utility vehicle, or the like, and carrying at least one chainsaw without having to conceal any part of the at least one chainsaw.
Figure 2:
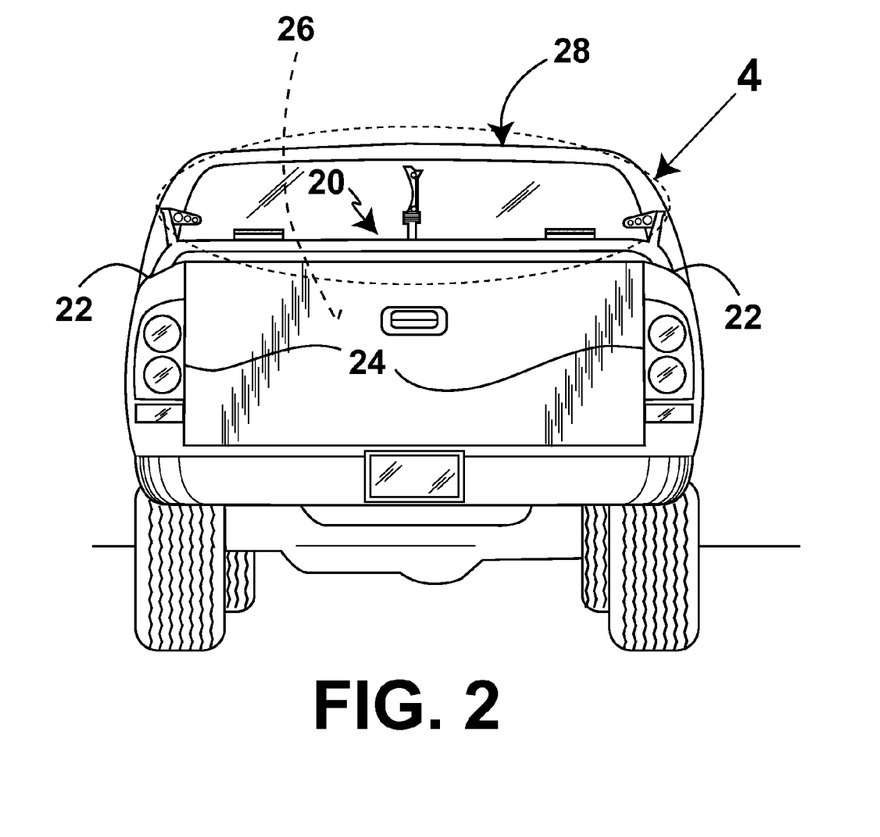
FIG. 2 is a diagrammatic rear end view of the rack of the embodiments of the present invention replaceably attached only to the pair of tops of the pair of side walls, respectively, of the cargo bay of either the pickup truck, the off-road utility vehicle, or the like shown in FIG. 1 but not carrying the at least one chainsaw.
Figure 3:
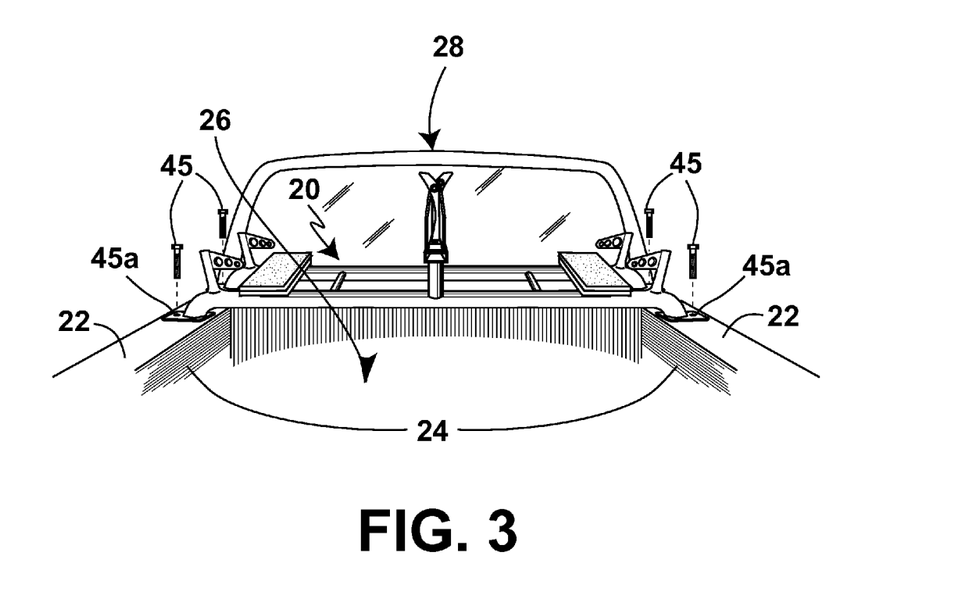

Referring now to the figures, in which like numerals indicate like parts, and particularly to FIGS. 1-3, which are, respectively, a diagrammatic rear end view of the rack of the embodiments of the present invention replaceably attached only to a pair of tops of a pair of side walls, respectively, of a cargo bay of either a pickup truck, an off-road utility vehicle, or the like, and carrying at least one chainsaw without having to conceal any part of the at least one chainsaw, a diagrammatic rear end view of the rack of the embodiments of the present invention replaceably attached only to the pair of tops of the pair of side walls, respectively, of the cargo bay of either the pickup truck, the off-road utility vehicle, or the like shown in FIG. 1 but not carrying the at least one chainsaw, and a diagrammatic perspective view of the rack of the embodiments of the present invention shown in FIG. 2 in the midst of being attached only to the pair of tops of the pair of side walls, respectively, of the cargo bay of either the pickup truck, the off-road utility vehicle, or the like, the rack of the embodiments of the present invention is shown generally at 20 for being replaceably attached only to a pair of tops 22 of a pair of side walls 24, respectively, of a cargo bay 26 of either a pickup truck 28, an off-road utility vehicle, or the like, and for carrying at least one chainsaw 30 without having to conceal any part of the at least one chainsaw 30. Each chainsaw of the at least one chainsaw 30 has a guide bar and chain working end 31 and housing non-working end 31a (FIG. 1).

B. Overall Configuration of the Rack 20.

The overall configuration of the rack 20 can best be seen in FIGS. 4 and 5, which are, respectively, an enlarged diagrammatic perspective view of the rack of the embodiments of the present invention identified by ARROW 4 in FIG. 2, and a diagrammatic perspective view of the rack of the embodiments of the present invention shown in FIG. 4 but carrying the at least one chainsaw, and as such, will be discussed with reference thereto.

The rack 20 comprises a base 32, a pair of end carriers 34, and a central carrier 36.

The base 32 has a pair of opposing ends 38, and is for being replaceably attached only to the pair of tops 22 of the pair of side walls 24, respectively, of the cargo bay 26 of either the pickup truck 28, the off-road utility vehicle, or the like.

Figure 5:
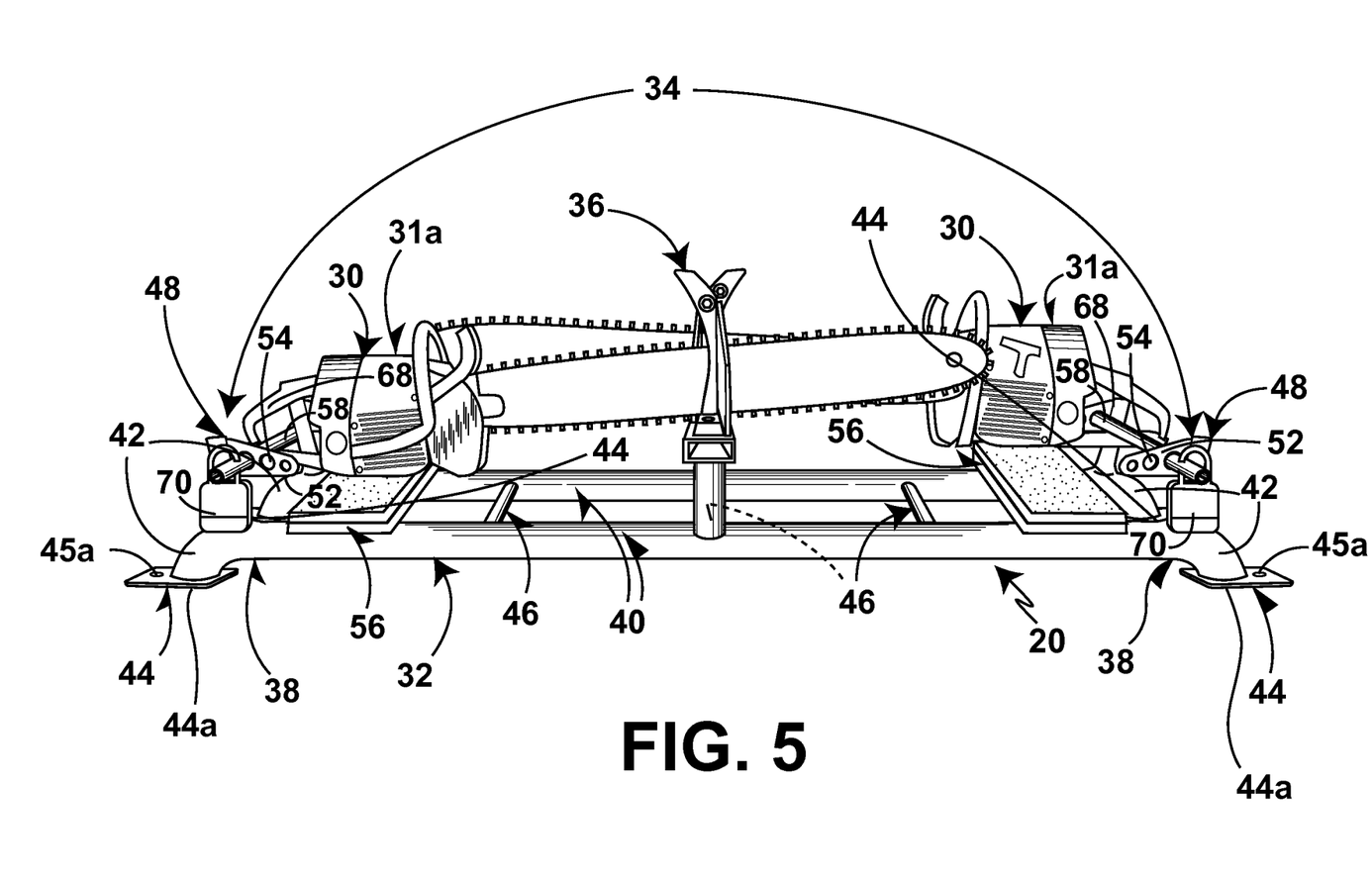
FIG. 5 is a diagrammatic perspective view of the rack of the embodiments of the present invention shown in FIG. 4 but carrying the at least one chainsaw.

The pair of end carriers 34 are disposed at the pair of opposing ends 38 of the base 32, respectively, and are for replaceably carrying the housing non-working end 31a of each chainsaw of the at least one chainsaw 30, respectively, without having to conceal any part of the at least one chainsaw 30 (FIG. 5).

The central carrier 36 is disposed midway between the pair of opposing ends 38 of the base 32, and is for replaceably carrying the guide bar and chain working end 31 of each chainsaw of the at least one chainsaw 30, respectively, without having to conceal any part of the at least one chainsaw 30 (FIG. 5).

(1) Specific Configuration of the Base 32.

The specific configuration of the base 32 can best be seen in FIGS. 4 and 5, which are, again, respectively, an enlarged diagrammatic perspective view of the rack of the embodiments of the present invention identified by ARROW 4 in FIG. 2, and a diagrammatic perspective view of the rack of the embodiments of the present invention shown in FIG. 4 but carrying the at least one chainsaw, and as such, will be discussed with reference thereto.

The base 32 comprises a pair of rails 40. The pair of rails 40 of the base 32 are spaced-apart from each other, are parallel to each other, and are for extending transversely from, and being replaceably attached only to, one top 22 of one side wall 24 of the cargo bay 26 of either the pickup truck 28, the off-road utility vehicle, or the like to the other top 22 of the other side wall 24 of the cargo bay 26 of either the pickup truck 28, the off-road utility vehicle, or the like.

The pair of rails 40 of the base 32 have ends 42. Each end 42 of the pair of rails 40 of the base 32 terminates in a dedicated mounting plate 44. The dedicated mounting plate 44 of each end 42 of the pair of rails 40 of the base 32 is for replaceably attaching the base 32 only to the pair of tops 22 of the pair of side walls 24, respectively, of the cargo bay 26 of either the pickup truck 28, the off-road utility vehicle, or the like using mounting bolts 45 passing through bores 45a in the dedicated mounting plate 44 of each end 42 of the pair of rails 40 of the base 32 (FIG. 3) and replaceably into the pair of tops 22 of the pair of side walls 24, respectively, of the cargo bay 26 of either the pickup truck 28, the off-road utility vehicle, or the like.

The ends 42 of the pair of rails 40 of the base 32 are turned-down so as to raise the rack 20 for not impinging upon space in the cargo bay 26 of either the pickup truck 28, the off-road utility vehicle, or the like.

The dedicated mounting plate 44 of each end 42 of the pair of rails 40 of the base 32 has a rubber lower surface 44a. The rubber lower surface 44a of the dedicated mounting plate 44 of each end 42 of the pair of rails 40 of the base 32 is for preventing damage to the pair of tops 22 of the pair of side walls 24, respectively, of the cargo bay 26 of either the pickup truck 28, the off-road utility vehicle, or the like once the rack 20 is mounted.

The base 32 further comprises three cross members 46. The three cross members 46 of the base 32 extend from one rail 40 of the base 32 to the other rail 40 of the base 32, and extend normally so as to maintain the pair of rails 40 of the base 32 parallel to each other.

Two of the three cross members 46 of the base 32 are disposed between the central carrier 36 and a respective end carrier 34, and thereby straddle the central carrier 36, while the third of the three cross members 46 of the base 32 is disposed inline and below the central carrier 36.

(2) Specific Configuration of the Pair of End Carriers 34.

The specific configuration of the pair of end carriers 34 can best be seen in FIGS. 4 and 5, which are again, respectively, an enlarged diagrammatic perspective view of the rack of the embodiments of the present invention identified by ARROW 4 in FIG. 2, and a diagrammatic perspective view of the rack of the embodiments of the present invention shown in FIG. 4 but carrying the at least one chainsaw, and as such, will be discussed with reference thereto.

The pair of end carriers 34 are disposed on the pair of rails 40 of the base 32, in close proximity to the ends 42 of the pair of rails 40 of the base 32, respectively.

Each end carrier 34 comprises a pair of locking rod mounts 48. Each locking rod mount 48 of each end carrier 34 extends upwardly from the pair of rails 40 of the base 32, in close proximity to an associated end 42 of the pair of rails 40 of the base 32.

Each locking rod mount 48 of each end carrier 34 comprises a post 50. The post 50 of each locking rod mount 48 of each end carrier 34 extends upwardly from the pair of rails 40 of the base 32, in close proximity to an associated end 42 of the pair of rails 40 of the base 32.

Each locking rod mount 48 of each end carrier 34 further comprises a triangular-shaped plate 52. The triangular-shaped plate 52 of each locking rod mount 48 of each end carrier 34 extends inwardly from the post 50 of an associated locking rod mount 48 of an associated end carrier 34.

The triangular-shaped plate 52 of each locking rod mount 48 of each end carrier 34 has a plurality of differently sized through bores 54. The plurality of differently sized through bores 54 of the triangular-shaped plate 52 of each locking rod mount 48 of each end carrier 34 extend laterally therethrough and align with that of the triangular-shaped plate 52 of an adjacent locking rod mount 48 of an associated end carrier 34.

Each end carrier 34 comprises a rubber-faced deck plate 56. The rubber-faced deck plate 56 of each end carrier 34 extends laterally from one rail 40 of the base 32 to the other rail 40 of the base 32, is disposed just inward of the triangular-shaped plate 52 of an associated pair of locking rod mounts 48 of an associated end carrier 34, and is for having the housing non-working end 31a of the at least one chainsaw 30 rest thereon during use of the rack 20 (FIG. 5).

Each end carrier 34 further comprise a locking slide rod 58. The locking slide rod 58 of each end carrier 34 has a head 60 and a shank 62.

The shank 62 of the locking slide rod 58 of each end carrier 34 extends from the head 60 of the locking slide rod 58 of an associated end carrier 34, and terminates in an end 64.

The shank 62 of the locking slide rod 58 of each end carrier 34 has a through bore 66 extending laterally therethrough, in proximity to the end 64 of the shank 62 of the locking slide rod 58 of an associated end carrier 34.

The locking slide rod 58 of each end carrier 34 extends through one through bore 54 of the triangular-shaped plate 52 of one locking rod mount 48 of an associated end carrier 34, through the handle 68 of an associated chainsaw 30, through an aligned through bore 54 of the triangular-shaped plate 52 of the other locking rod mount 48 of the associated end carrier 34, and being received in the through bore 66 of the shank 62 of the locking slide rod 58 of the associated end carrier 34, is a lock 70 to prevent unauthorized removal of the locking slide rod 58 of the associated end carrier 34 and then removal of the associated chainsaw 30, with the head 60 of the locking slide rod 58 of the associated end carrier 34 preventing unauthorized removal of the locking slide rod 58 of the associated end carrier 34 from the other end thereof.

The locking slide rod 58 of each end carrier 34 is rubber-coated for preventing damage to the handle 68 of the associated chainsaw 30.

(3) Specific Configuration of the Central Carrier 36.

Figure 4:
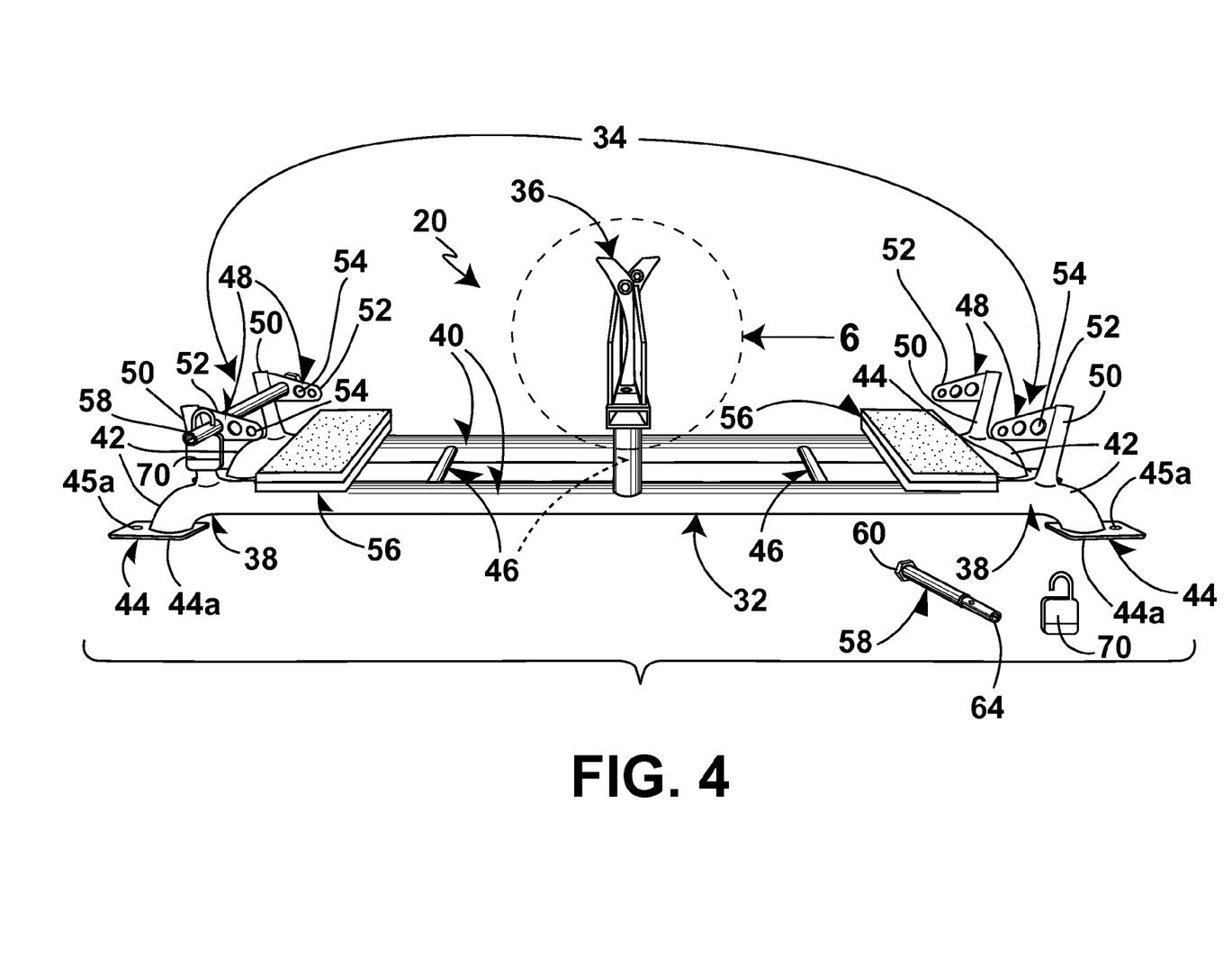
FIG. 4 is an enlarged diagrammatic perspective view of the rack of the embodiments of the present invention identified by ARROW 4 in FIG. 2.
Figure 6:
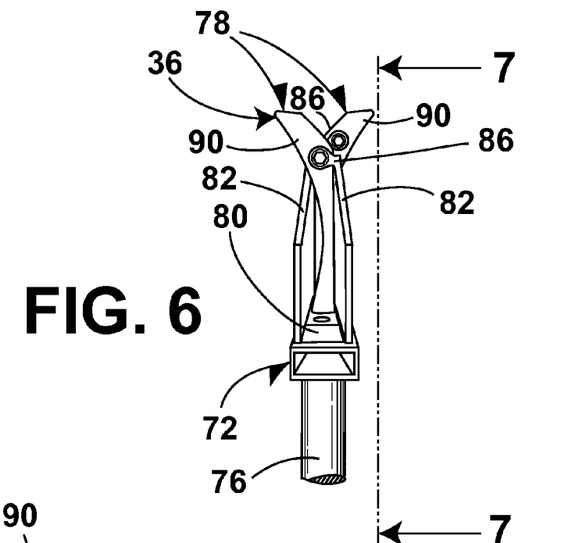
FIG. 6 is an enlarged diagrammatic front elevational view of the area generally enclosed by the dotted circle identified by ARROW 6 in FIG. 4 of the central carrier of the rack of the embodiments of the present invention.
Figure 7:
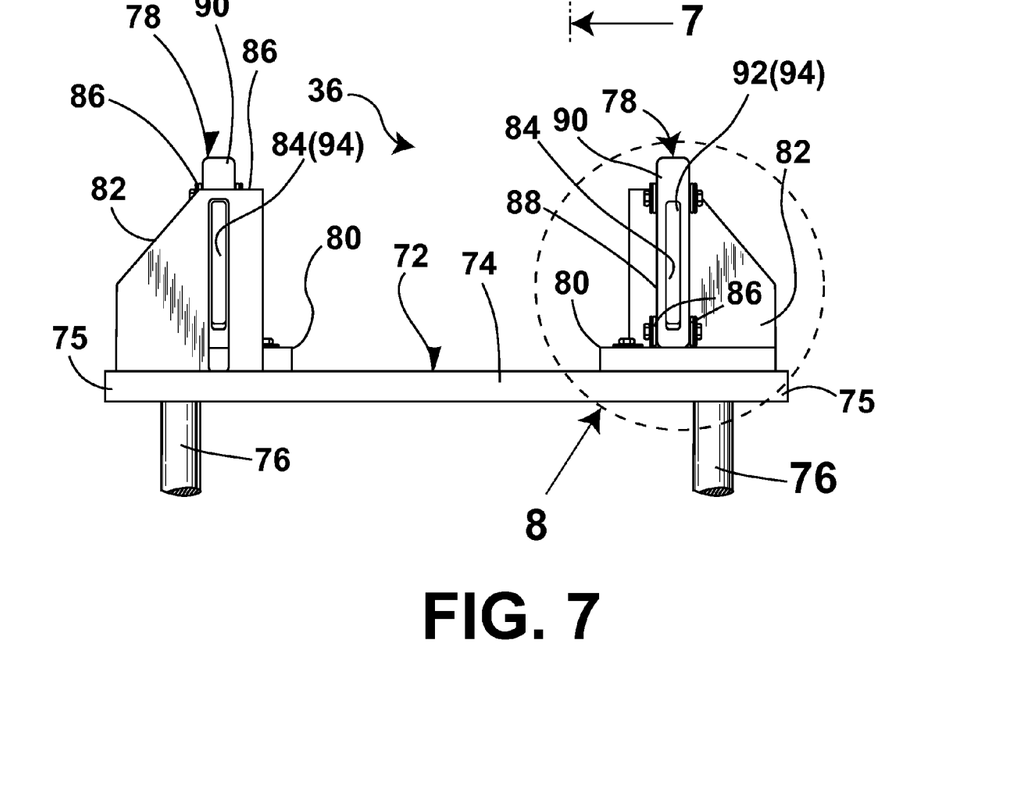
FIG. 7 is a reduced diagrammatic side elevational view of the central carrier of the rack of the embodiments of the present invention taken in the direction of ARROWS 7 in FIG. 6.
Figure 8:
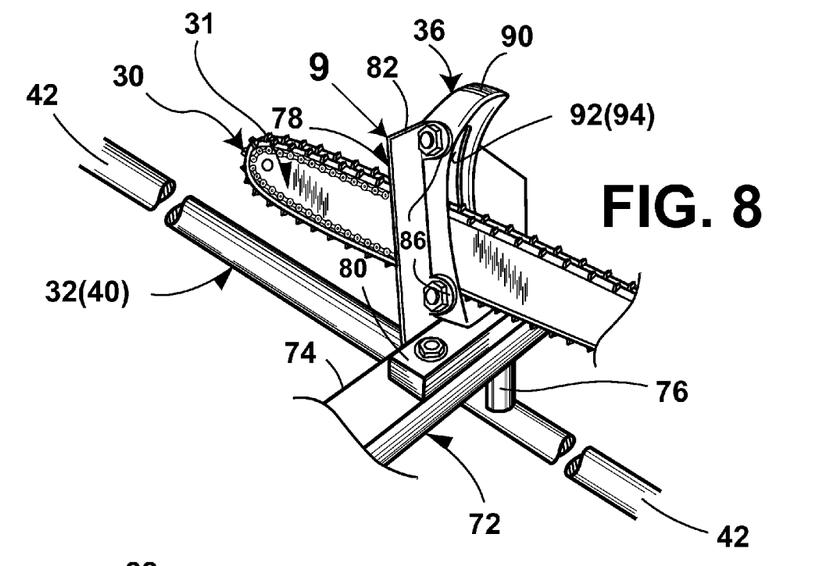
FIG. 8 is an enlarged diagrammatic perspective view of the area generally enclosed by the dotted circle identified by ARROW 8 in FIG. 7 but with the guide bar and chain of a chainsaw being carried by the central carrier of the rack of the embodiments of the present invention.
Figure 9:
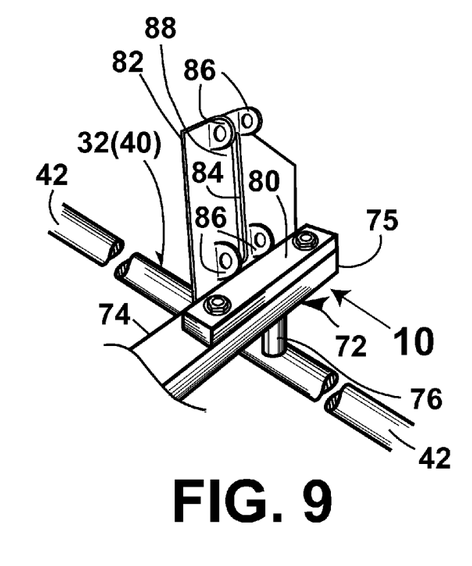
FIG. 9 is a diagrammatic perspective view of a portion of the central carrier of the rack of the embodiments of the present invention identified by ARROW 9 in FIG. 8.
Figure 10:
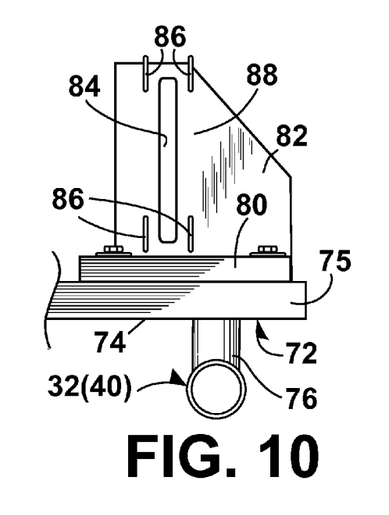
FIG. 10 is a diagrammatic side elevational view taken in the direction of ARROW 10 in FIG. 9.

The specific configuration of the central carrier 36 can best be seen in FIGS. 6-10, which are, respectively, an enlarged diagrammatic front elevational view of the area generally enclosed by the dotted circle identified by ARROW 6 in FIG. 4 of the central carrier of the rack of the embodiments of the present invention, a reduced diagrammatic side elevational view of the central carrier of the rack of the embodiments of the present invention taken in the direction of ARROWS 7 in FIG. 6, an enlarged diagrammatic perspective view of the area generally enclosed by the dotted circle identified by ARROW 8 in FIG. 7 but with the guide bar and chain of a chainsaw being carried by the central carrier of the rack of the embodiments of the present invention, a diagrammatic perspective view of a portion of the central carrier of the rack of the embodiments of the present invention identified by ARROW 9 in FIG. 8, and a diagrammatic side elevational view taken in the direction of ARROW 10 in FIG. 9, and as such, will be discussed with reference thereto.

The central carrier 36 is disposed on the pair of rails 40 of the base 32, midway between the ends 42 of the pair of rails 40 of the base 32.

The central carrier 36 comprises a base 72. The base 72 of the central carrier 36 includes a rod 74 having ends 75 and a pair of posts 76.

The pair of posts 76 of the base 72 of the central carrier 36 depend from the rod 74 of the central carrier 36, and are spaced-apart from each other a distance between the pair of rails 40 of the base 32 so as to allow the pair of posts 76 of the base 72 of the central carrier 36 to be attached to the pair of rails 40 of the base 32, respectively, and allow the base 72 of the central carrier 36 to extend laterally across, and above, the pair of rails 40 of the base 32.

The central carrier 36 further comprises a pair of bar guide mounts 78. Each bar guide mount 78 of the central carrier 36 extends upwardly from an associated end 75 of the rod 74 of the base 72 of the central carrier 36.

Each bar guide mount 78 of the central carrier 36 comprises a block 80. The block 80 of each bar guide mount 78 of the central carrier 36 is disposed at, and is aligned with, an associated end 75 of the rod 74 of the base 72 of the central carrier 36.

Each bar guide mount 78 of the central carrier 36 further comprises a backing plate 82. The backing plate 82 of each bar guide mount 78 of the central carrier 36 extends upwardly from an associated end 75 of the rod 74 of the base 72 of the central carrier 36, and is braced against the block 80 of an associated bar guide mount 78 of the central carrier 36.

The backing plate 82 of each bar guide mount 78 of the central carrier 36 has a through slot 84 extending therethrough. The through slot 84 of the backing plate 82 of each bar guide mount 78 of the central carrier 36 is vertically oriented.

The backing plate 82 of each bar guide mount 78 of the central carrier 36 further has a plurality of tabs 86. The plurality of tabs 86 of the backing plate 82 of each bar guide mount 78 of the central carrier 36 extend normally outwardly from the backing plate 82 of an associated bar guide mount 78 of the central carrier 36, and form a cradle 88 therebetween.

Each guide mount 78 of the central carrier 36 further comprises a chainsaw bar guide 90. The chainsaw bar guide 90 of each guide mount 78 of the central carrier 36 sits replaceably in the cradle 88 of an associated bar guide mount 78 of the central carrier 36.

The chainsaw bar guide 90 of each guide mount 78 of the central carrier 36 has a through slot 92 extending therethrough. The through slot 92 of the chainsaw bar guide 90 of each guide mount 78 of the central carrier 36 is vertically oriented, and is aligned with the through slot 84 of the backing plate 82 of an associated bar guide mount 78 of the central carrier 36 so as to form a compound through slot 94 therewith. The compound through slot 94 of each guide mount 78 of the central carrier 36 is for receiving the guide bar and chain working end 31 of an associated chainsaw 30 (FIG. 8).

The chainsaw bar guide 90 of each guide mount 78 of the central carrier 36 is made of hardened plastic for not damaging the guide bar and chain working end 31 of an associated chainsaw 30 replaceably held therein.

C. Impressions.

It will be understood that each of the elements described above or two or more together may also find a useful application in other types of constructions differing from the types described above.

While the embodiments of the present invention have been illustrated and described as embodied in a rack for being replaceably attached only to a pair of tops of a pair of side walls, respectively, of a cargo bay of either a pickup truck, an off-road utility vehicle, or the like, and for carrying at least one chainsaw without having to conceal any part of the at least one chainsaw, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A rack for being replaceably attached only to a pair of tops of a pair of side walls, respectively, of a cargo bay of a pickup truck, and for carrying at least one chainsaw, wherein each of the at least one chainsaw has a guide bar and chain working end and a housing non-working end, said rack comprising:
   a) a base;
   b) a pair of end carriers; and
   c) a central carrier;
   wherein said base has a pair of opposing ends;
   wherein said base is for being replaceably attached only to the pair of tops of the pair of side walls, respectively, of the cargo bay of the pickup truck;
   wherein said pair of end carriers are disposed at said pair of opposing ends of said base, respectively;
   wherein said pair of end carriers are for replaceably carrying the housing non-working end of the at least one chainsaw;
   wherein said central carrier is disposed midway between said pair of opposing ends of said base;
   wherein said central carrier is for replaceably carrying the guide bar and chain working end of the at least one chainsaw;
   wherein said base comprises a pair of rails;
   wherein said pair of rails of said base are spaced-apart from each other;
   wherein said pair of rails of said base are parallel to each other;
   wherein said pair of rails of said base are for extending transversely from, and being replaceably attached only to, one top of one side wall of the cargo bay of the pickup truck to the other top of the other side wall of the cargo bay of the pickup truck;
   wherein said pair of rails of said base have ends;
   wherein each end of said pair of rails of said base terminates in a dedicated mounting plate;
   wherein said dedicated mounting plate of each end of said pair of rails of said base is for replaceably attaching said base only to the pair of tops of the pair of side walls, respectively, of the cargo bay of the pickup truck;
   wherein said dedicated mounting plate of each end of said pair of rails of said base is for replaceably attaching said base only to the pair of tops of the pair of side walls, respectively, of the cargo bay of the pickup truck using mounting bolts passing through through bores in said dedicated mounting plate of each end of said pair of rails of said base and replaceably into the pair of tops of the pair of side walls, respectively, of the cargo bay of the pickup truck;
   wherein said ends of said pair of rails of said base are turned-down so as to raise said rack for not impinging upon space in the cargo bay of the pickup truck;
   wherein said dedicated mounting plate of each end of said pair of rails of said base has a rubber lower surface;
   wherein said rubber lower surface of said dedicated mounting plate of each end of said pair of rails of said base is for preventing damage to the pair of tops of the pair of side walls, respectively, of the cargo bay of the pickup truck once said rack is mounted;
   wherein said base comprises three cross members
   wherein said three cross members of said base extend from one rail of said base to the other rail of said base;
   wherein said three cross members of said base extend normally so as to maintain said pair of rails of said base parallel to each other;
   wherein two of said three cross members of said base are disposed between said central carrier and a respective end carrier, and thereby straddle said central carrier;
   wherein a third of said three cross members of said base is disposed inline and below said central carrier
   wherein said pair of end carriers are disposed on said pair of rails of said base; and
   wherein said pair of end carriers are disposed in close proximity to said ends of said pair of rails of said base, respectively;
   wherein each end carrier of said pair of end carriers comprises a pair of locking rod mounts;
   wherein each locking rod mount of each end carrier extends upwardly from said pair of rails of said base;
   wherein each locking rod mount of each end carrier is disposed in close proximity to an associated end of said pair of rails of said base;
   wherein each locking rod mount of each end carrier comprises a post;
   wherein said post of each locking rod mount of each end carrier extends upwardly from said pair of rails of said base;
   wherein said post of each locking rod mount of each end carrier is disposed in close proximity to an associated end of said pair of rails of said base;
   wherein each locking rod mount of each end carrier comprises a triangular-shaped plate; and
   wherein said triangular-shaped plate of each locking rod mount of each end carrier extends inwardly from said post of an associated locking rod mount of an associated end carrier.

2. The rack of claim 1, wherein said triangular-shaped plate of each locking rod mount of each end carrier has a plurality of differently sized through bores; wherein said plurality of differently sized through bores of said triangular-shaped plate of each locking rod mount of each end carrier extends laterally therethrough; and wherein said triangular-shaped plate of each locking rod mount of each end carrier aligns with that of said triangular-shaped plate of an adjacent locking rod mount of an associated end carrier.

3. The rack of claim 2, wherein each end carrier comprises a rubber-faced deck plate.

4. The rack of claim 3, wherein said rubber-faced deck plate of each end carrier extends laterally from one rail of said base to the other rail of said base;
   wherein said rubber-faced deck plate of each end carrier is disposed just inward of said triangular-shaped plate of an associated pair of locking rod mounts of an associated end carrier; and
   wherein said rubber-faced deck plate of each end carrier is for having the housing non-working end of an associated chainsaw rest thereon during use of said rack.

5. The rack of claim 4, wherein each end carrier comprise a locking slide rod.

6. The rack of claim 5, wherein said locking slide rod of each end carrier has:
a) a head; and
b) a shank;
wherein said shank of said locking slide rod of each end carrier extends from said head of an associated locking slide rod of said end carrier; and
wherein said shank of said locking slide rod of said end carrier terminates in an end.

7. The rack of claim 6, wherein said shank of said locking slide rod of said end carrier has a through bore extending laterally therethrough; and
wherein said through bore of said shank of said locking slide rod of each end carrier is disposed in proximity to said end of said shank of said locking slide rod of an associated end carrier.

8. The rack of claim 7, wherein said locking slide rod of each end carrier extends through one through bore of said triangular-shaped plate of one locking rod mount of an associated end carrier, through the handle of an associated chainsaw, through an aligned through bore of said triangular-shaped plate of the other locking rod mount of said associated end carrier, and receiving in said through bore of said shank of said locking slide rod of said associated end carrier, is a lock to prevent unauthorized removal of said locking slide rod of said associated end carrier and then removal of the associated chainsaw, with said head of said locking slide rod of said associated end carrier preventing unauthorized removal of said locking slide rod of said associated end carrier from the other end.

9. The rack of claim 8, wherein said locking slide rod of each end carriers is rubber-coated for preventing damage to the handle of an associated chainsaw.

10. The rack of claim 9, wherein said central carrier is disposed on said pair of rails of said base; and
wherein said central carrier is disposed midway between said ends of said pair of rails of said base.

11. The rack of claim 10, wherein said central carrier comprises a base;
wherein said base of said central carrier includes:
a) a rod; and
b) a pair of posts.

12. The rack of claim 11, wherein said pair of posts of said base of said central carrier depend from said rod of said base of said central carrier; and
wherein said pair of posts of said base of said central carrier are spaced-apart from each other a distance between said pair of rails of said base so as to allow said pair of posts of said base of said central carrier to be attached to said pair of rails of said base, respectively, and allow said base of said central carrier to extend laterally across, and above, said pair of rails of said base.

13. The rack of claim 12, wherein said central carrier comprises a pair of bar guide mounts.

14. The rack of claim 13, wherein each bar guide mount of said central carrier extends upwardly from an associated end of said rod of said base of said central carrier.

15. The rack of claim 14, wherein each bar guide mount of said central carrier comprises a block.

16. The rack of claim 15, wherein said block of each bar guide mount of said central carrier is disposed at an associated end of said rod of said base of said central carrier; and
wherein said block of each bar guide mount of said central carrier is aligned with said associated end of said rod of said base of said central carrier.

17. The rack of claim 16, wherein each bar guide mount of said central carrier comprises a backing plate.

18. The rack of claim 17, wherein said backing plate of each bar guide mount of said central carrier extends upwardly from an associated end of said rod of said base of said central carrier; and
wherein said backing plate of each bar guide mount of said central carrier is braced against said block of an associated bar guide mount of said central carrier.

19. The rack of claim 18, wherein said backing plate of each bar guide mount of said central carrier has a through slot extending therethrough.

20. The rack of claim 19, wherein said through slot of said backing plate of each bar guide mount of said central carrier is vertically oriented.

21. The rack of claim 20, wherein said backing plate of each bar guide mount of said central carrier has a plurality of tabs.

22. The rack of claim 21, wherein said plurality of tabs of said backing plate of each bar guide mount of said central carrier extend normally outwardly from said backing plate of an associated bar guide mount of said central carrier; and
wherein said plurality of tabs of said backing plate of each bar guide mount of said central carrier form a cradle therebetween.

23. The rack of claim 22, wherein each guide mount of said central carrier comprises a chainsaw bar guide.

24. The rack of claim 23, wherein said chainsaw bar guide of each guide mount of said central carrier sits replaceably in said cradle of an associated bar guide mount of said central carrier.

25. The rack of claim 24, wherein said chainsaw bar guide of each guide mount of said central carrier has a through slot extending therethrough.

26. The rack of claim 25, wherein said through slot of said chainsaw bar guide of each guide mount of said central carrier is vertically oriented;
wherein said through slot of said chainsaw bar guide of each guide mount of said central carrier is aligned with said through slot of said backing plate of an associated bar guide mount of said central carrier so as to form a compound through slot therewith; and
wherein said compound through slot of each guide mount of said central carrier is for receiving the guide bar and chain working end of an associated chainsaw.

27. The rack of claim 26, wherein said chainsaw bar guide of each guide mount of said central carrier is made of hardened plastic for not damaging the guide bar and chain working end of an associated chainsaw replaceably held therein.

* * * * *